(12) United States Patent
Zhu

(10) Patent No.: US 7,065,278 B2
(45) Date of Patent: Jun. 20, 2006

(54) OPTICAL MODULE AND METHOD FOR ASSEMBLING AN OPTICAL MODULE

(75) Inventor: Xiaofan Zhu, Cupertino, CA (US)

(73) Assignee: Nippon Sheet Glass Co., Ltd., Osaka (JP)

( * ) Notice: Subject to any disclaimer, the term of this patent is extended or adjusted under 35 U.S.C. 154(b) by 458 days.

(21) Appl. No.: 10/093,019

(22) Filed: Mar. 7, 2002

(65) Prior Publication Data

US 2002/0131701 A1 Sep. 19, 2002

(30) Foreign Application Priority Data

Mar. 16, 2001 (JP) ............... 2001-076272

(51) Int. Cl.
*G02B 6/26* (2006.01)
(52) U.S. Cl. .......................... 385/52; 385/31
(58) Field of Classification Search ............ 385/31–34, 385/76–78, 80, 88, 89, 92–96; 700/59
See application file for complete search history.

(56) References Cited

U.S. PATENT DOCUMENTS

| | | | |
|---|---|---|---|
| 4,714,315 A * | 12/1987 | Krause .................... | 385/96 |
| 4,812,002 A * | 3/1989 | Kato et al. ................ | 385/33 |
| 5,383,118 A * | 1/1995 | Nguyen .................... | 700/59 |
| 5,430,816 A * | 7/1995 | Furuya et al. ............. | 385/33 |
| 6,190,056 B1 * | 2/2001 | Kwon et al. ............... | 385/91 |
| 6,318,908 B1 * | 11/2001 | Nakanishi et al. .......... | 385/89 |
| 6,956,999 B1 * | 10/2005 | Case et al. ................ | 385/52 |

FOREIGN PATENT DOCUMENTS

| | | |
|---|---|---|
| JP | 02-019810 | 1/1990 |
| JP | 07-005341 | 1/1995 |

* cited by examiner

*Primary Examiner*—Michael G. Lee
*Assistant Examiner*—Jamara A. Franklin
(74) *Attorney, Agent, or Firm*—Crompton, Seager & Tufte, LLC

(57) ABSTRACT

An inexpensive optical module that avoids misalignment of optical axes and is fixed together with high reliability. Optical elements are aligned with each other and then fixed to a connecting member. The connecting member has first and second bonding surfaces. A relatively large area of the first and second bonding surfaces contacts the optical elements. The connecting member has a simple structure. This facilitates the manufacturing of the connecting member. The distance between the optical elements and the connecting member is minimized. Thus, the optical element is fixed together with high reliability.

6 Claims, 3 Drawing Sheets

OPTICAL MODULE AND METHOD FOR ASSEMBLING AN OPTICAL MODULE

BACKGROUND OF THE INVENTION

The present invention relates to an optical module manufactured by assembling together optical elements, such as optical fibers, waveguides, lenses, light emitting devices, and light detecting devices, and to a method for assembling such an optical module.

Japanese Laid-Open Patent Publication 7-5341 describes a prior art optical collimator array, or an optical module. The prior art optical collimator array has an optical fiber array, which includes a plurality of optical fibers, a micro-lens array, which includes a plurality of lenses, and a spacer. The micro-lens array is fixed to the spacer so that an end portion of the micro-lens array is exposed from a light passage window of the spacer. The spacer is then fixed to the optical fiber array so that the optical axis of each optical fiber is aligned with the optical axis of an associated one of the lenses.

The spacer includes a retaining portion, which receives the micro-lens array, a bonding surface joined with the optical fiber array, and a groove extending parallel to the bonding surface and defining the window. The retaining portion is formed so that when the spacer is fixed to the optical fiber array, the distance between the end surfaces of the micro-lenses in the micro-lens array and the end surfaces of the corresponding optical fibers is equal to the focal distance of the micro-lenses.

Nowadays, the alignment of the optical fiber array and the micro-lens array is simplified to facilitate the manufacturing of the optical collimator array. More specifically, the micro-lenses are retained in the spacer, and the spacer is bonded with an end portion of the optical fiber array. This optimizes the distance (Z axis position) between the micro-lenses and the optical fibers. The employment of such a spacer, which is machined with high accuracy, reduces the number of operations performed to adjust the alignment of the optical collimator array.

The optical fiber array includes two reference light fibers, which are used to position the micro-lenses. The two reference light fibers are each arranged at one of the two lateral ends of the optical fiber array. Beams of light emitted from the micro-lenses via the optical fibers and beams of light directly emitted from the two reference fibers are each received by a CCD camera and shown on a monitor. The beam of lights emitted from the two reference light fibers form two spots of light on the monitor. A reference line is defined by connecting the two spots of light. The spacer is fixed to the optical fiber array at a position where the beams of lights emitted from the micro-lenses fall on the reference line. This aligns the optical axis of each optical fiber with the optical axis of each micro-lens.

However, since the number of coordinates used for the alignment is decreased, the positioning of the micro-lens array and the optical fiber array may become improper. This may misalign the optical axes of the micro-lens array and the optical axes of the optical fiber array.

Further, the spacer, which has a complicated structure, must be machined with high accuracy to decrease the number of coordinates used for alignment. This increases the cost of the optical module.

When the optical fiber array is bonded with the optical fiber array at an aligned position, a V-shaped gap may be formed between the joining surface of the spacer and the end surface of the optical fiber end portion. Such V-shaped gap results in a bonding layer, which bonds the spacer and the optical fiber array, having an increased thickness. Such a thick bonding layer decreases reliability with regard to the fastening of the spacer to the micro-lens array and the optical fiber array.

SUMMARY OF THE INVENTION

It is an objective of the present invention to provide an inexpensive and highly accurate optical module that avoids misalignment of optical axes. It is also an objective of the present invention to provide a method for assembling such optical module.

To achieve the above objective, the present invention provides an optical module including at least one first optical element having a first surface, and at least one second optical element having a second surface. The first and second optical elements are positioned relative to each other using predetermined coordinates. At least one connecting member connects the positioned first and second optical elements with a predetermined gap provided in between. The connecting member has a first bonding surface bonded with at least part of the first surface and a second bonding surface bonded with at least part of the second surface. The first and second bonding surfaces are spaced from the associated first and second surfaces by a minimal distance when the first and second bonding surfaces are bonded with the first and second surfaces.

A further perspective of the present invention is a method for assembling an optical module comprising the steps of positioning at least one first optical element and at least one second optical element using predetermined coordinates, engaging a connecting member with the positioned first and second optical elements, and fixing the positioned first and second optical elements to the connecting member.

A further perspective of the present invention is an optical module including a first optical element having a first outer surface, a second optical element having a second outer surface and positioned relative to the first optical element, and a connecting member for connecting the positioned first and second optical elements to each other. The connecting member includes a first bonding surface, which is formed in correspondence with the first outer surface and bonded with at least part of the first outer surface, and a second bonding surface, which is formed in correspondence with the second outer surface and bonded with at least part of the second outer surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An optical module and a method for assembling the optical module according to a first embodiment of the present invention will now be discussed.

Figure 1A:
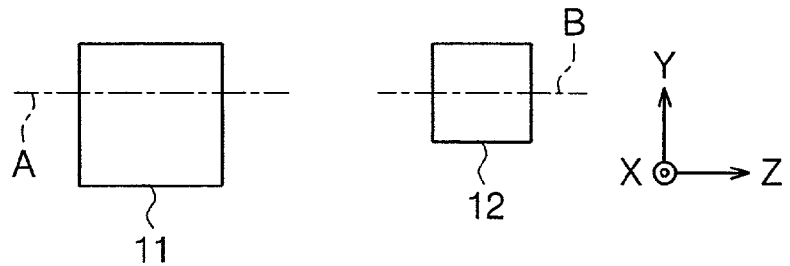
FIG. 1A and FIG. 1B are explanatory diagrams illustrating a method for assembling an optical module according to a first embodiment of the present invention.
Figure 1B:
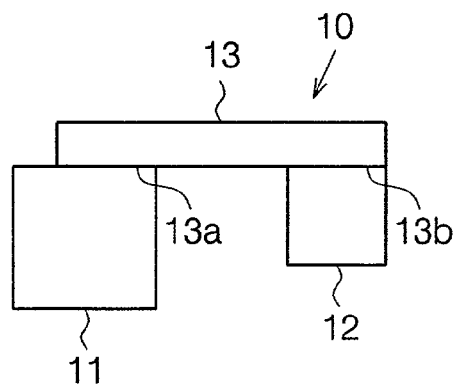

Referring to FIG. 1B, an optical module 10 includes two optical elements 11, 12 and a connecting member 13. The connecting member 13 connects the two optical elements 11, 12 with a predetermined space provided in between. Each of the optical elements 11, 12 may be an optical fiber, a waveguide, a lens, a light emitting element, or a light detecting element. Alternatively, each of the optical elements 11, 12 may be a one-dimensional array or a two-dimensional array formed by optical fibers, waveguides, lenses, light emitting elements, or light detecting elements. The connecting member 13 has a predetermined area that is relatively large so that it can be connected to the optical elements 11, 12. More specifically, the connecting member 13 has a first bonding surface 13a, which is formed in correspondence with the outer surface of the optical element 11. The connecting member 13 also has a second bonding surface 13b, which is formed in correspondence with the outer surface of the optical element 12. Thus, the connecting member 13 connects the optical elements 11, 12 to each other with sufficient strength.

The optical element 11 has an optical axis A, and the optical element 12 has an optical axis B. The optical elements 11, 12 are positioned such that a light output from the optical module 10 is maximal. Subsequent to the positioning, the optical elements 11, 12 are fixed to the connecting member 13 and are connected to each other. More specifically, light is emitted from the optical element 11 to the optical element 12. A light detecting element (not shown) detects the intensity of the light that passes through the optical element 12. The two optical elements 11, 12 are positioned such that the intensity of the detected light is maximal.

If the optical elements 11, 12 are mono-channel members, which have optical characteristics that are symmetric about the axes A, B, the distance between the optical elements 11, 12 along a Z axis, which is parallel to the optical axes A, B, is adjusted. The relative positions of the optical elements 11, 12 along the X and Y axes, which are perpendicular to the Z axis is also adjusted. Further, the rotational angle θx about the X axes of the optical elements 11, 12 and the rotational angle θy about the Y axes of the optical elements 11, 12 are adjusted. In other words, optical elements, which are optically symmetric, are positioned using X, Y, and Z coordinates and angles θx, θy.

If the two optical elements 11, 12 are members or arrays that are not optically symmetric, the rotational angle θz about the Z axes are adjusted. In other words, optical elements, which are not optically symmetric, are positioned using X, Y, and Z coordinates and angles θx, θy, θz.

In this manner, the two optical elements 11, 12 are positioned in accordance with their optical characteristics using all of the coordinates (alignment adjusting axes) that are to be used for the positioning.

A method for assembling the optical module 10 will now be discussed.

The method for assembling the optical module 10 includes a first step S1 and a second step S2.

In the first step S1, the two optical elements 11, 12 are positioned (refer to FIG. 1A). More specifically, in the first step S1, the relative X positions, the relative Y positions, the relative Z positions, the angles θx, the angles θy, and, if necessary, the angles θz of the two optical elements 11, 12 are each optimized. In other words, the optical elements 11, 12 are aligned using all of the coordinates necessary for positioning (X, Y, Z, θx, θy, (θz)).

In the second step S2, the optical elements 11, 12 are connected and fixed to each other by the connecting member 13 (refer to FIG. 1B).

In the second step S2, in a state in which the connecting member 13 is held as close as possible to the optical elements 11, 12, the optical elements 11, 12 and the connecting member may be welded to one another by a laser beam. This fixes the optical elements 11, 12 and the connecting member 13 to one another.

Alternatively, in a state in which the connecting member contacts the optical elements, the optical elements 11, 12 and the connecting member 13 may be bonded to one another by an ultraviolet curable resin.

The first embodiment has the advantages described below.

(1) The optical elements 11, 12 are each aligned using all of the coordinates necessary for positioning (X, Y, Z, θx, θy, (θz)). Since the optical elements 11, 12 are aligned so that the optical axis A of the optical element 11 coincides with the optical axis B of the optical element 12, the misalignment of the two axes A, B is reduced.

The optical elements 11, 12 are bonded with the connecting member 13 by a relatively thin bonding layer, which is formed by a laser welding layer or an ultraviolet curable resin. Accordingly, the connecting member 13 may have a simple shape, and highly accurate machining of the connecting member 13 is not necessary. This decreases the manufacturing cost of the optical module 10.

The connecting member 13 has bonding surfaces 13a, 13b, each of which has sufficient area for bonding with the associated optical element 11, 12. The relatively thin bonding layer and the relatively large bonding surfaces securely bond together the connecting member 13 and the optical elements 11, 12. Accordingly, the fastening of the optical elements 11, 12 has a high reliability.

The connecting member 13 needs only to have a relatively large area that contacts the optical elements 11, 12. Accordingly, the connecting member 13 has a simple shape and machining that requires high accuracy is not necessary.

In the first embodiment, the optical module 10 avoids misalignment of the optical axes and is inexpensive. Further, the optical module 10 is fixed together with high reliability.

Figure 2:
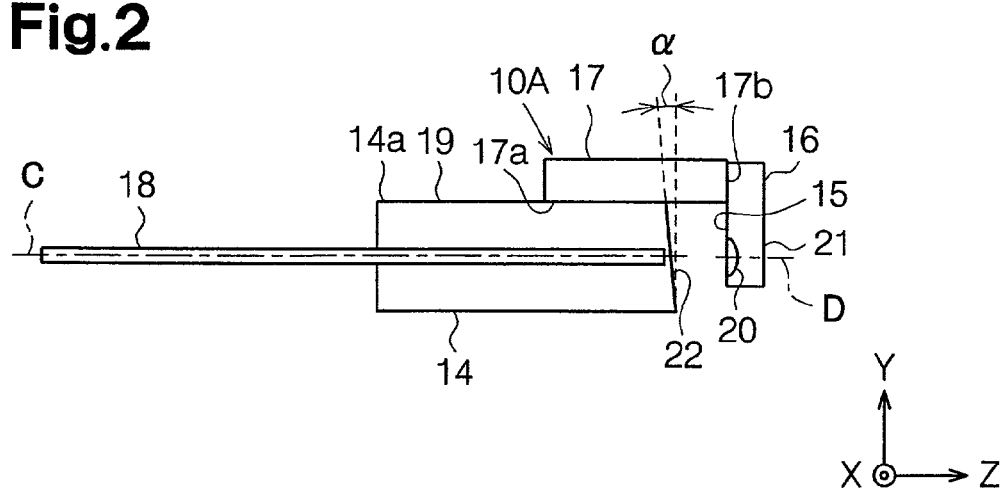
FIG. 2 is a schematic diagram illustrating an optical module according to a second embodiment of the present invention.
Figure 3:
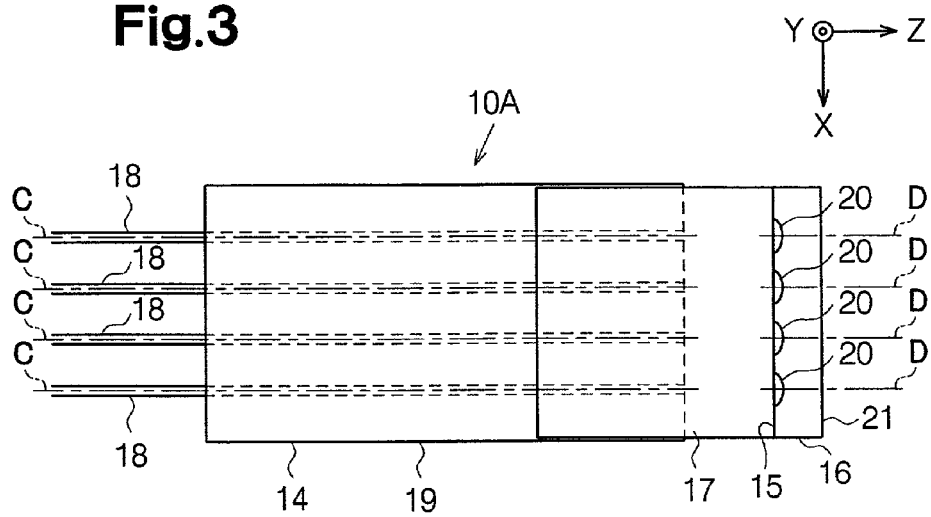
FIG. 3 is a plan view showing the optical module of FIG. 2.
Figure 4:
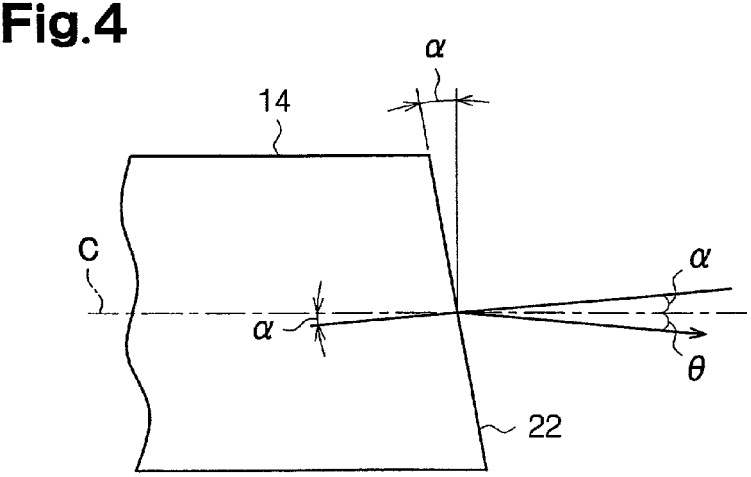
FIG. 4 is an explanatory diagram illustrating the differentiated angle of a light emitted from the axis of the optical module of FIG. 2.

An optical module and a method for assembling the optical module according to a second embodiment of the present invention will now be discussed with reference to FIGS. 2 and 3.

An optical module 10A includes two optical elements, a box-like optical fiber array 14 and a gradient index planar micro-lens array 16. A connecting member, or connecting plate 17, connects the optical fiber array 14 and the micro-lens array 16.

The optical fiber array 14 includes a box-like holder 19, which holds a plurality of (four in the second embodiment) optical fibers 18. The micro-lens array 16 has a plurality of (four in the second embodiment) micro-lenses 20, which are each opposed to an associated one of the optical fibers 18 and which are arranged parallel to one another.

The micro-lens array 16 has a surface on which the micro-lenses 20 are arranged, or a lens surface 15, and an opposite surface, or a base surface 21. The micro-lens array 16 is not provided in the base surface 21. The micro-lens array 16 is positioned so that the lens surface 15 faces an emission surface 22 of the optical fiber array 14.

The emission surface 22 of the optical fiber array 14 is inclined by a first angle α relative to a hypothetical plane perpendicular to the axes of the optical fibers 18, or the fiber axes C. It is preferred that the first angle α be 1 to 20 degrees. In the second embodiment, the first angle α is 8 degrees.

The connecting plate 17 includes a first bonding surface, or a lower surface 17a, which is connected with a flat upper surface 14a of the optical fiber array 14, and a second bonding surface, or a right surface 17b, which is connected with the lens surface 15 of the micro-lens array 16. The first bonding surface 17a is flat to correspond with the upper surface 14a of the optical fiber array 14. The second bonding surface 17b is flat to correspond with the lens surface 15 of the micro-lens array 16. Accordingly, the connecting plate 17 has a relatively large area that contacts the two arrays 14, 16. The thickness of the connecting plate 17, or the distance between the lower surface 17a and upper surface of the connecting plate 17, is, for example, about one millimeter.

A method for assembling the optical module 10A will now be discussed.

The method for assembling the optical module 10A includes a first step S1 and a second step S2.

In the first step S1, the two arrays 14, 16 are positioned. More specifically, in the first step S1, the relative X positions, the relative Y positions, the relative Z positions, the angles θx, the angles θy, and, if necessary, the angles θz of the two arrays 14, 16 are each optimized. In other words, the arrays 14, 16 are aligned using all of the coordinates necessary for positioning (X, Y, Z, θx, θy, θz).

In the second step S2, the optical fiber array 14 and the micro-lens array 16 are connected to each other by the connecting plate 17. More specifically, the lower surface 17a and right surface 17b of the connecting plate 17 are respectively engaged with the upper surface of the optical fiber array 14 and the lens surface 15 of the micro-lens array 16. The connecting plate 17 is then bonded with the optical fiber array 14 and the micro-lens array 16 using a bonding means, such as a curing resin or laser welding.

In a state in which the arrays 14, 16 are positioned, the optical fiber array 14 is held horizontally so that the upper surface 14a of the optical fiber array 14 is faced upward. The connecting plate 17 is then arranged on the upper surface 14a of the optical fiber array 14. The connecting plate 17 is then moved along the upper surface 14a so that the right surface 17b of the connecting plate 17 contacts the lens surface 15 of the micro-lens array 16. At this position, the connecting plate 17 is bonded with the arrays 14, 16 by the bonding means. The connecting plate 17 is left in the same state until the connecting plate 17 is rigidly bonded to the arrays 14, 16. During this period, the weight of the connecting plate 17 acts on the arrays 14, 16. Thus, the connecting plate 17 is pressed against the arrays 14, 16. Instead of leaving the connecting plate 17 in the same state, the connecting plate 17 may be forcibly pressed against the arrays 14, 16. In this manner, the frictional force produced between the connecting plate 17 and the arrays 14, 16 keeps the arrays 14, 16 fixed in the positioned state.

(2) The connecting plate 17 has a bonding surface formed in correspondence with the output surfaces of the two arrays 14, 16. This minimizes the distance (thickness of the bonding layer) between the two arrays 14, 16 and the connecting plate 17. More specifically, the flat lower surface 17a of the connecting plate 17 has a relatively large area that is bonded with the flat upper surface 14a of the optical fiber array 14, and the flat right surface 17b of the connecting plate 17 has a relatively large area that is bonded with the lens surface 15 of the micro-lens array 16. Thus, the two arrays 14, 16 are held in a fixed state with high reliability such that the optical axes are not misaligned. Further, the connecting plate 17 has a simple shape and highly accurate machining is thus not necessary.

(3) The optical fiber array 14 has the inclined emission surface 22. This reflects the light emitted from the optical fibers 18 and decreases the amount of light returned to the optical fiber 18.

A method for assembling an optical module 10B according to a third embodiment of the present invention will now be discussed with reference to FIG. 5.

In the optical fiber array 14 of the second embodiment, a beam of light misaligned with the fiber axis C by angle θ is emitted from the emission surface 22, which is inclined by the first angle α. The differentiated angle θ is obtained in accordance with the first angle α and the refractive index n from the following equation:

$$\theta = \sin^{-1}(n \cdot \sin \alpha) - \alpha.$$

The third embodiment solves the problems caused by the misalignment of the light emitted from the optical fiber array 14 relative to the fiber axes C.

More specifically, the optical module 10B of the third embodiment includes a box-like optical fiber array 14, a micro-lens array 16, and a box-like connecting sleeve 23. The optical fiber array 14 has four flat side surfaces 14a and an inclined emission surface 22. The micro-lens array 16 includes a base surface 21, which opposes the emission surface 22 of the optical fiber array 14, and a lens surface 15, in which micro-lenses 20 are formed. The connecting sleeve 23 has first bonding surfaces, or rectangular inner surfaces 23a, and a second bonding surface 23b, which is bonded with the base surface 21 of the micro-lens array 16. The first bonding surfaces 23a are flat so that they correspond to the side surfaces 14a of the optical fiber array 14. The second bonding surface 23b is inclined so that it corresponds to the base surface 21 of the micro-lens array 16.

The micro-lens array 16 is arranged so that it is inclined in a direction opposite to the inclination of the emission surface 22 of the optical fiber array 14. More specifically, the base surface 21 is inclined by a predetermined second angle relative to a plane perpendicular to the fiber axes C. It is preferred that the second angle be about the same as the differentiated angle θ. The end surface 23b of the connecting sleeve 23 is inclined so that it contacts the base surface 21.

The method for assembling the optical module 10B will now be discussed.

The method for assembling the optical module 10B includes a first step S1 and a second step S2.

In the first step S1, the connecting sleeve 23 is attached to the optical fiber array 14, or the holder 19, with a sufficient gap provided between the end surface 23b and the base surface 21. The base surface 21 of the micro-lens array 16 is opposed to the emission surface 22 of the optical fiber array 14. The arrays 14, 16 are then aligned with each other using all of the necessary coordinates.

In the second step S2, the connecting sleeve 23 is moved along the side surfaces until the end surface 23b contacts the base surface 21 of the micro-lens array 16. In this state, the inner surfaces 23a and the end surface 23b of the connecting sleeve 23 are bonded with the side surfaces 14a of the optical fiber array 14 and the base surface 21 of the micro-lens array 16, respectively. This integrally fixed the two arrays 14, 16 to each other.

Figure 5:
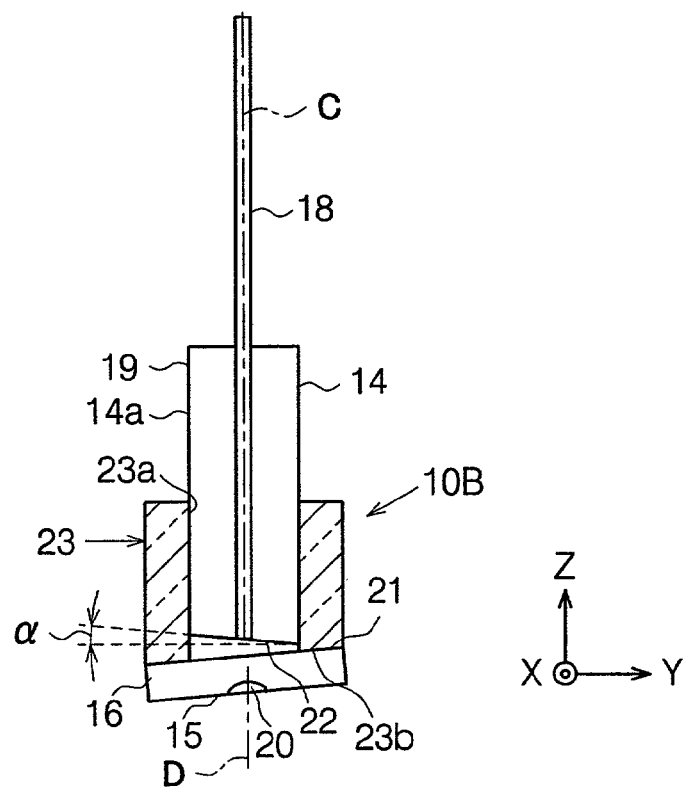
FIG. 5 is a schematic cross-sectional view showing an optical module according to a third embodiment of the present invention.

In the second step S2, it is preferred that the emission surface 22 of the optical fiber array 14 face a downward direction, as viewed in FIG. 5. More specifically, in a state in which the arrays 14, 16 are positioned, the connecting sleeve 23 is moved downward along the side surfaces 14a of the optical fiber array 14 until the end surface 23b of the connecting sleeve 23 contacts the lens surface 15 of the array 16. At this position, the connecting sleeve 23 is bonded with the arrays 14, 16 using the bonding means. The connecting sleeve 23 is left in the same state until the connecting sleeve 23 is rigidly bonded to the arrays 14, 16. The weight of the connecting sleeve 23 presses the connecting sleeve 23 against the arrays 14, 16. The connecting sleeve 23 may forcible be pressed against the arrays 14, 16 until the connecting sleeve 23 is forcibly joined with the arrays 14, 16.

The third embodiment has the advantages described below.

(4) The connecting sleeve 23 has the bonding surfaces 23a, 23b, which are shaped in correspondence with the outer surfaces of the arrays 14, 16. This minimizes the distance between the two arrays 14, 16 and the connecting sleeve 23 (i.e., the thickness of the bonding layer). More specifically, the connecting sleeve 23 is bonded with the micro-lens array 16 with the end surface 23b contacting the base surface 21 and bonded with the optical fiber array 14 with the inner surfaces 23a contacting the side surfaces 14a of the optical fiber array 14. The connecting sleeve 23 has a relatively large area that is bonded with the optical fiber array 14 and the micro-lens array 16. Accordingly, the connecting sleeve 23 is rigidly fixed to the two arrays 14, 16 with high reliability. Since the connecting sleeve 23 has a simple shape, highly accurate machining is not required.

(5) The beam of light emitted from the emission surface 22 of the optical fiber array 14 is differentiated from the fiber axis C by angle θ. However, the connecting sleeve 23 holds the micro lens array 16 inclined by the second angle, which is about the same as angle θ. Thus, the angular difference between the axes of the emitted light and the lens axes D of the micro-lenses 20 is less than angle θ.

Figure 6:
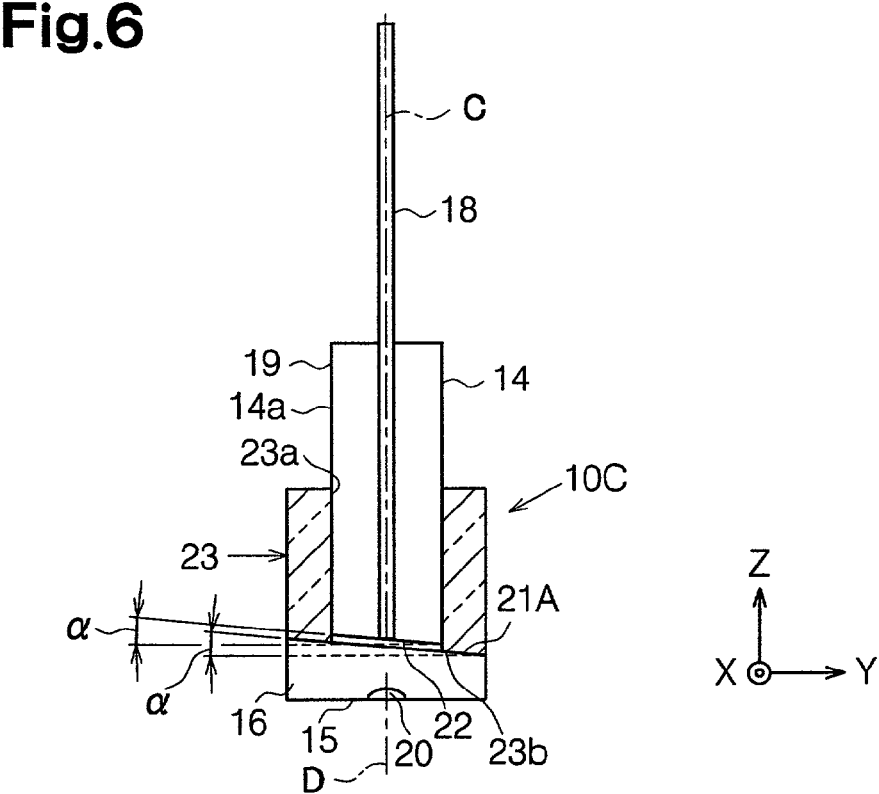
FIG. 6 is a schematic cross-sectional view showing an optical module according to a fourth embodiment of the present invention.

An optical module 10C and a method for assembling the optical module 10C according to a fourth embodiment of the present invention will now be discussed with reference to FIG. 6.

The optical module 10C of the fourth embodiment includes an optical fiber array 14, a micro-lens array 16, which is opposed to the optical fiber array 14, and a connecting sleeve 23, which is fixed to the two arrays 14, 16.

The optical fiber array 14 has an emission surface 22, which is inclined by a first angle α relative to a plane perpendicular to the fiber axes C. The micro-lens array 16 includes a lens surface 15, in which micro-lenses 20 are formed, and a base surface 21A, which is inclined relative to the lens surface 15 by an angle that is almost the same as the first angle α. The base surface 21A and the emission surface 22 are inclined in the same direction relative to a plane perpendicular to the fiber axes C.

The connecting sleeve 23 has first bonding surfaces, or flat inner surfaces 23a, which are shaped in correspondence with the side surfaces 14a of the optical fiber array 14, and a second bonding surface, or an end surface 23b, which is shaped in correspondence with the base surface 21 of the micro-lens array 16.

The end surface 23b is inclined relative to a plane perpendicular to the fiber axes C by an angle that is about the same as the first angle α. This enables planar contact between the end surface 23b and the base surface 21A. The connecting sleeve 23 connects the micro-lens array 16 and the optical fiber array 14 so that the base surface 21A is substantially parallel to the emission surface.

The fourth embodiment has the advantages discussed below.

(6) The base surface 21A of the micro-lens array 16 is arranged close to and substantially parallel to the emission surface 22 of the optical fiber array 14. This decreases the angular difference between the lens axes D and the light emitted from the emission surface 22. As a result, the beam of light emitted from each micro-lens 20 is substantially parallel to the fiber axes C.

In the first to fourth embodiments, the optical elements (11, 12; 14, 16) are aligned by an aligning apparatus, such as that described in Japanese Laid-Open Patent Publication No. 2-19810. It is preferred that the optical elements be held by the aligning apparatus when bonded by the bonding element (13; 17; 23).

It should be apparent to those skilled in the art that the present invention may be embodied in many other specific forms without departing from the spirit or scope of the invention. Particularly, it should be understood that the present invention may be embodied in the following forms.

The optical modules 10, 10A, 10B, 10C of the above embodiments have two optical elements 11, 12 or 14, 15 and one connecting member 13 or 16. However, an optical module may have an N number of optical elements and an N−1 number of connecting members to connect the optical elements.

In the second to fourth embodiments, the two arrays 14, 16 may be replaced by other optical elements. For example, other types of lens arrays, such as a convex lens array, may replace the gradient index planar micro-lens array 16.

In the second to fourth embodiment, the optical fiber array 14 has four optical fibers 18. However, the number of optical fibers 18 is not limited to four and may be any number.

In the third and fourth embodiments, two connecting plates may be used instead of one connecting sleeve 23 to connect the two arrays 14, 16. In such case, it is preferred that the array 14 be held between the two connecting plates.

In the second to fourth embodiments, the optical fiber array 14 and the micro-lens array 16 may each be formed by two fiber collimator arrays. In such case, from the light emitted from a first micro-lens array 16, a first micro-lens array 16 produces an enlarged and substantially parallel beam. A second micro-lens array 16, or a light-detecting micro-lens array, collects the enlarged beam in a second optical fiber array 14. An optical module such as a light matrix switch is obtained by arranging a functional element between the first and second micro-lens arrays 16. In this manner, a pair of fiber collimator arrays may be used in various optical modules.

The present examples and embodiments are to be considered as illustrative and not restrictive, and the invention is not to be limited to the details given herein, but may be modified within the scope and equivalence of the appended claims.

What is claimed is:

1. A method for assembling an optical module comprising the steps of:
   providing a first optical array including a plurality of first optical elements and having a first surface and a second optical array including a plurality of second optical elements and having a second surface;
   positioning the first optical array and the second optical array with respect to all necessary coordinates; and then
   providing a connecting member for connecting the positioned first and second optical arrays; and thereafter
   fixing the positioned first and second optical arrays by the connecting member without moving the first and second optical arrays that are positioned;
   wherein the fixing step includes the steps of:
   contacting the connecting member with the first surface of the first optical array;
   moving the connecting member along the first surface of the first optical array until the connecting member contacts the second surface of the second optical array;
   bonding the connecting member with the first optical array and the second optical array; and
   leaving the connecting member until the connecting member is rigidly fixed to the first and second optical arrays.

2. The method according to claim 1, wherein the bonding step includes pressing the connecting member against as least one of the first and second optical arrays.

3. The method according to claim 1, wherein the contacting step includes placing the connecting member on the first optical array, and the banding step includes applying the weight of the connecting member on the first optical array.

4. The method according to claim 1, wherein the bonding step includes:
   applying an ultraviolet curable resin in a state in which the connecting member is engaged with the first and second optical arrays; and
   hardening the ultraviolet curable resin.

5. The method according to claim 1, wherein the bonding step includes welding the connecting member with the first and second optical arrays in a state in which the connecting member is engaged with the first and second optical arrays.

6. The method according to claim 1, wherein the positioning step includes aligning the first arid second optical arrays such that the intensity of a light output from the optical module is maximal.

* * * * *

UNITED STATES PATENT AND TRADEMARK OFFICE
CERTIFICATE OF CORRECTION

| | | |
|---|---|---|
| PATENT NO. | : 7,065,278 B2 | Page 1 of 1 |
| APPLICATION NO. | : 10/093019 | |
| DATED | : June 20, 2006 | |
| INVENTOR(S) | : Xiaofan Zhu | |

It is certified that error appears in the above-identified patent and that said Letters Patent is hereby corrected as shown below:

Column 10
Line 6, delete "banding", and insert therefor -- bonding --.

Line 19, delete "arid", and insert therefor -- and --.

Signed and Sealed this

Nineteenth Day of September, 2006

JON W. DUDAS
*Director of the United States Patent and Trademark Office*